Figure 7:
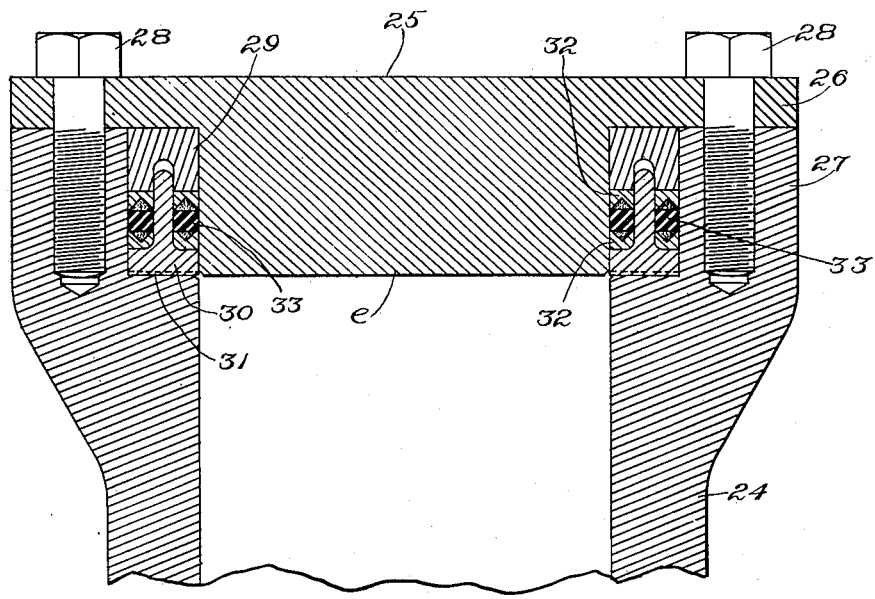

Aug. 27, 1929.  J. C. SOLBERG  1,725,836
PACKING FOR HIGH PRESSURE JOINTS
Filed June 12, 1925  2 Sheets-Sheet 1
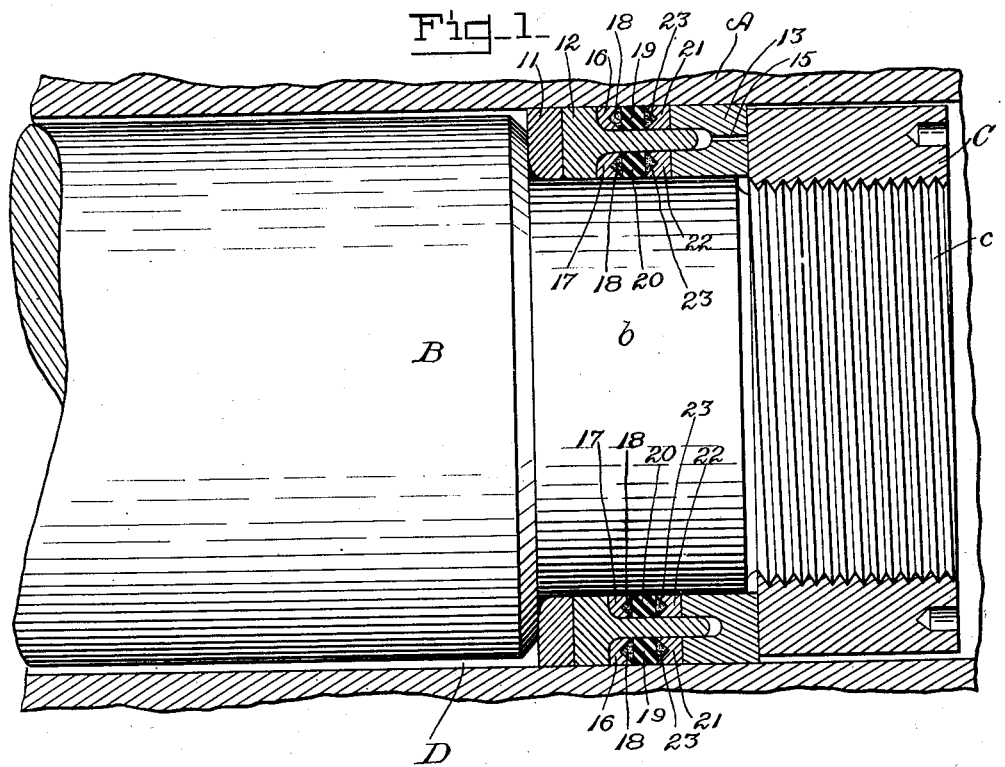
 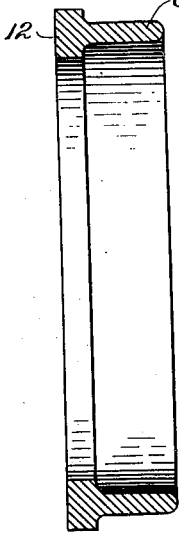 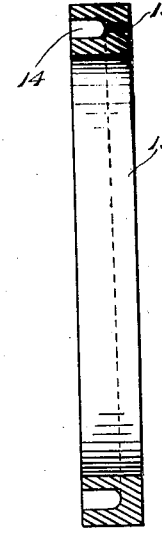 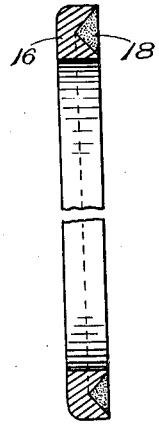 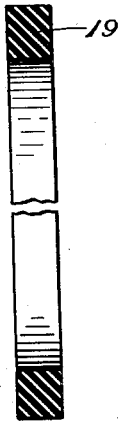
INVENTOR=
John C. Solberg.
by MacLeod, Calvert, Copeland & Dike.
ATTORNEYS.

Aug. 27, 1929.　　J. C. SOLBERG　　1,725,836
PACKING FOR HIGH PRESSURE JOINTS
Filed June 12, 1925　　2 Sheets-Sheet 2

INVENTOR:
John C. Solberg.
by Macleod, Calver, Copeland & Dike.
ATTORNEYS.

Patented Aug. 27, 1929.

1,725,836

UNITED STATES PATENT OFFICE.

JOHN C. SOLBERG, OF ARLINGTON, MASSACHUSETTS, ASSIGNOR OF ONE-HALF TO FREDERICK C. LANGENBERG, OF CAMBRIDGE, MASSACHUSETTS.

PACKING FOR HIGH-PRESSURE JOINTS.

Application filed June 12, 1925. Serial No. 36,754.

My invention relates to improved packing for cylinders and co-operating members such as pistons, and is intended for use to prevent leakage when subjected to high pressures. Heretofore, in the practice of increasing the elastic limit of guns, shells, and other tubular objects by subjecting them to fluid pressures, the operations have been hampered because the packings would not resist the extreme pressures employed. As the usual pressures may be from 80,000 to 120,000 pounds per square inch, the difficulty of maintaining tight joints will be readily appreciated. My present invention is particularly intended for use under these conditions, as for instance, for closing of the bore of a gun which is to be expanded by fluid pressure to increase the elastic limit. The invention is also applicable to packing the covers of containers in which fluids under high pressure are to be stored. Other uses for and applications of the invention will be readily seen.

The invention will be fully understood from the following description when taken in connection with the accompanying drawings and the novel features thereof will be pointed out and clearly defined in the claims at the close of this specification.

In the drawings:

Fig. 1 is a sectional view of a bore of a gun in which is shown a portion of a spool member and a nut secured thereto to close the bore of the gun and withstand the end thrust of the pressure by which the bore of the gun is to be expanded, the joint between the spool and the bore being packed with a packing embodying my invention.

Fig. 2 shows the end ring 11.
Fig. 3 shows the rib ring 12.
Fig. 4 shows the grooved ring 13.
Fig. 5 shows the bronze packing ring 16.
Fig. 6 shows the rubber packing ring 19.
Fig. 7 shows a packing embodying my invention as applied to a container for compressed gas such as nitrogen.

Referring now to the drawings and particularly Figs. 1 to 6 inclusive, at A is shown a portion of a gun the bore of which is to be closed to permit the same to be subjected to fluid pressure to expand the bore and thus increase the elastic limit of the material composing the gun. For this purpose, it is necessary to close the bore and hold the closing member against longitudinal movement which would otherwise be caused by the longitudinal thrust produced by the pressure. For this purpose the bore of the gun is partly filled by a member B commonly known as a spool. This member has a portion $b$ of reduced diameter and is screw threaded as shown at $c$. On the screw threaded portion is placed a collar C. It is the object of the packing embodying my invention to make a tight joint between the wall of the gun A and the reduced portion $b$. It will be understood that these parts are chosen merely as a convenient illustration of the use of my invention and that the packing is capable of use in many other situations. On the turned down portion $b$ is placed a ring 11. This is made of bronze, steel or other suitable material and fits as closely as practicable between the cylindrical member $b$ and the gun bore. The construction of this ring is shown clearly in Fig. 2. Next to the end ring 11 is placed a rib ring 12 (see Fig. 3) having an annular rib $d$. This ring also fits as closely as possible into the space to be packed. Cooperating with the rib ring 12 is a groove ring 13 (see Fig. 4) which has an annular groove 14 of size and shape to receive the rib $d$ of the rib ring 12. The ring is also drilled as shown at 15 to permit any leakage to escape and prevent the groove filling in case leakage takes place, particularly before the packing has tightened up. Next to the rib ring 12 is placed a pair of packing rings 16 and 17, the larger of these being shown in Fig. 5. Each of these rings is made of bronze or steel and grooved on one end face, the groove being filled with lead or similar soft metal 18. The packing ring 16 is of a diameter to fit over the outside of the rib on ring 12 and occupy the space between the rib and the bore of the gun. The packing ring 17 is of the same construction but smaller diameter and fills the space between the rib and the cylindrical member $b$. Next to this packing member are two rubber packing rings 19 and 20, the larger of these rings being shown in Fig. 6. These two rings have the same diameters as the corresponding packing rings 16 and 17. Next to the packings 19 are two more bronze packing rings 21 and 22 each having a lead filled groove 23. These rings are identical in construction with the two rings 16 and 17 previously described.

The parts are assembled on the cylindrical portion *b* of the spool B in the order and arrangement shown in the drawings and the nut or collar C is screwed down onto them.

When the fluid under pressure enters the space D between the spool and the bore of the gun, it contacts with the end ring 11 and pushes the end ring 11 and rib ring 12 toward the groove ring 13, movement of the groove ring 13 being withstood by the collar C. This subjects the four packing rings and two rubber rings to the total pressure on the end face of the end ring 11. Since the effective area of the packing is less than the effective area of the end ring 11 by an amount equal to the cross sectional area of the rib, the pressure per unit of area on the packing is greater than the pressure per unit of area on the fluid. Likewise since the packing, when subjected to these high pressures is substantially plastic, the pressure per unit of area exerted on the bore of the gun and on the cylindrical wall of the cylindrical portion *b* will be equal to the pressure per unit of area exerted on the packing itself. It will, therefore, be seen that the packing is held against the bore with a greater pressure than the fluid can exert and therefore it cannot force its way past the packing. The packing therefore forms an effective barrier to prevent leakage.

In Fig. 7, I have shown my improved packing as applied to a container such as is used for nitrogen and the like. Heretofore great difficulty has been experienced in keeping the covers of such containers tightly packed. In Fig. 7, the body of the container is shown at 24 and the cover at 25. The cover is provided with an outwardly extending flange 26 which cooperates with the flange 27 on the container and the cover is held in place by a series of suitable bolts or cap screws 28. At the upper end, the bore of the container is enlarged to form an annular space to receive the packing and the cover has a cylindrical or piston member *e* which extends down into the container. Next to the flange on the cover, I place a groove ring 29 and next to the shoulder of the annular space in the container, I place a rib ring 30. The rib ring on the face of the shoulder is preferably radially grooved, as shown at 31, to allow pressure to enter under the rib ring 30. Between the opposing faces of the rib ring and the groove ring, I place a series of packing rings like those already described. They may consist of four lead-filled bronze or steel rings 32 and two rubber packing ribs 33 or any other suitable combination of packing rings.

The parts are assembled as described and the cover put in place and the cap screws 28 tightened for a convenient amount and thereafter the container can be filled with fluid under pressure. The pressure passes through the grooves 31 under the rib ring 30. This pushes the rib ring toward the grooved ring 29 and exerts a total pressure on the packing rings which is equal to the total pressure exerted on the rib ring. The pressure on the wall of the piston portion E of the cover 25 and on the bore of the container is therefore greater than the pressure per unit of area on the fluid within the container. The joint is therefore held absolutely tight and no leakage is possible. Furthermore, the tightness of the joint is independent of the amount the bolts 28 are set up, their only functions being to hold the cover on the container and to prevent the container from expanding under the radial load imposed upon it.

What I claim is:

1. The improved packing which includes as a part thereof a pair of rings having grooves on their opposing faces, said grooves being filled with a relatively soft metal and a ring of compressible material such as rubber between the two metallic rings.

2. The improved packing for use between concentric cylindrical members comprising a ring having a rib thereon, a second ring having a complementary groove therein and between the opposing faces of said rings two sets of packing rings each of said sets comprising a pair of metallic rings having grooves in their proximate faces, said grooves being filled with a softer metal and there being between the said rings a third ring of a soft material such as rubber.

In testimony whereof I affix my signature.

JOHN C. SOLBERG.